United States Patent
Iranzad

(10) Patent No.: US 11,476,936 B2
(45) Date of Patent: Oct. 18, 2022

(54) POINT AHEAD OFFSET ANGLE FOR FREE SPACE OPTICAL NODES

(71) Applicant: SA Photonics, Inc., Los Gatos, CA (US)

(72) Inventor: Mohammad Noshad Iranzad, Santa Clara, CA (US)

(*) Notice: Subject to any disclaimer, the term of this patent is extended or adjusted under 35 U.S.C. 154(b) by 0 days.

(21) Appl. No.: 17/313,895

(22) Filed: May 6, 2021

(65) Prior Publication Data

US 2021/0351844 A1     Nov. 11, 2021

Related U.S. Application Data

(60) Provisional application No. 63/021,025, filed on May 6, 2020.

(51) Int. Cl.
    *H04B 10/118*    (2013.01)
    *H04B 10/112*    (2013.01)

(52) U.S. Cl.
    CPC ....... *H04B 10/118* (2013.01); *H04B 10/1125* (2013.01)

(58) Field of Classification Search
None
See application file for complete search history.

(56) References Cited

U.S. PATENT DOCUMENTS

| | | | | |
|---|---|---|---|---|
| 4,635,299 A * | 1/1987 | MacGovern | ....... | H04B 10/1125 356/153 |
| 6,535,314 B1 * | 3/2003 | Mendenhall | ......... | H04B 10/118 398/121 |
| 8,213,803 B2 * | 7/2012 | Wu | ....... | H04B 10/118 398/131 |
| 10,411,797 B1 | 9/2019 | Mitchell | | |
| 2004/0141754 A1 * | 7/2004 | Cheng | ................ | H04B 10/1125 398/122 |
| 2004/0202474 A1 * | 10/2004 | Britz | .................. | H04B 10/1125 398/118 |
| 2014/0248058 A1 | 9/2014 | Simpson et al. | | |
| 2016/0226584 A1 | 8/2016 | Chalfant | | |
| 2017/0288776 A1 * | 10/2017 | Dickson | ............... | H04B 10/118 |
| 2018/0294946 A1 | 10/2018 | Sinclair et al. | | |
| 2019/0081703 A1 * | 3/2019 | Miller | .................. | H04B 10/116 |

(Continued)

OTHER PUBLICATIONS

PCT International Search Report and Written Opinion, PCT Application No. PCT/US2021/031059, dated Aug. 6, 2021, 12 pages.

*Primary Examiner* — Jai M Lee

(74) *Attorney, Agent, or Firm* — BakerHostetler; Tayan B. Patel

(57) ABSTRACT

A free space optical (FSO) communication node communicates via an FSO link with a remote FSO communication node that moves relative to the FSO node. The FSO node may be highly directional, and transmit (Tx) and receive (Rx) beams of the FSO node may share optical paths (at least in part). Instead of directing a Tx beam along a point ahead angle relative to a Rx beam (which may result in undesirable Rx coupling losses), the Tx beam is directed based on the point ahead angle and a point ahead offset angle. The point ahead offset angle modifies the point ahead angle to reduce Rx coupling losses while keeping Tx pointing losses at least low enough to maintain the FSO link. In some cases, due to the point ahead offset angle, the Tx direction minimizes a sum of the Rx coupling losses and the Tx pointing losses.

22 Claims, 13 Drawing Sheets

(56) References Cited

U.S. PATENT DOCUMENTS

2019/0261262 A1     8/2019   Stiles et al.
2021/0351844 A1*   11/2021   Iranzad .............. H04B 10/1125
2022/0085885 A1*   3/2022   Rein ...................... H04B 10/40

* cited by examiner

POINT AHEAD OFFSET ANGLE FOR FREE SPACE OPTICAL NODES

CROSS-REFERENCE TO RELATED APPLICATION

This application claims priority under 35 U.S.C. § 119(e) to U.S. Provisional Patent Application Ser. No. 63/021,025, "Point Ahead for Intersatellite Optical Links," filed May 6, 2020, which is incorporated herein by reference in its entirety.

BACKGROUND

1. Technical Field

This disclosure relates to communication between free space optical (FSO) communication nodes in motion relative to each other and, more particularly, to optimizing transmit and receive angles for the nodes.

2. Description of Related Art

FSO communication is an optical communication technology that uses light propagating in free space to wirelessly transmit data, for example, for telecommunications or computer networking. Free space is a communication medium that can include air, outer space, or vacuum and contrasts with solid communication mediums, such as optical fiber cables. FSO technology is useful where physical connections are impractical due to high costs or other considerations. FSO technology typically requires very accurate pointing between nodes to establish and maintain a viable FSO link.

SUMMARY

A free space optical (FSO) communication node (also referred to as a terminal) in motion relative to a remote FSO node may set a transmit (Tx) direction of a Tx beam towards an expected future location of a remote FSO node. This point ahead angle may cause a large misalignment between the local FSO node and a receive (Rx) beam from the remote FSO node. This may contribute substantially to Rx coupling losses since only a portion of the Rx beam is collected by the local FSO node.

Embodiments described herein overcome this problem. Instead of directing the Tx beam along a point ahead angle (which may result in undesirable Rx coupling losses between the Rx beam and the FSO node), the FSO node directs the Tx beam in a direction based on the point ahead angle and a point ahead offset angle (also referred to as a point ahead correction). The point ahead offset angle modifies the point ahead angle to reduce Rx coupling losses while keeping Tx pointing losses at least low enough to maintain the FSO communication link. In some cases, this modified point ahead angle minimizes a sum of the Rx coupling losses and the Tx pointing losses. Thus, by directing the Tx beam based on the point ahead angle and point ahead offset angle, the Rx and Tx coupling efficiencies between the nodes may be increased without adding additional components to the FSO nodes.

Some embodiments relate to an FSO communication terminal includes a Tx pathway, a Rx pathway, a beam steering unit, and a control system. The FSO communication terminal may be collinear or co-borsighted. The Tx pathway is configured to transmit a data-encoded Tx optical beam through free space to a remote FSO communication terminal. The Tx pathway is oriented along a direction in free space, and a relative motion between the two FSO communication terminals is known. The Rx pathway is configured to receive a data-encoded Rx optical beam transmitted through free space from the remote FSO communication terminal. The Rx pathway is oriented along the same direction in free space as the Tx pathway. The Rx pathway may remain oriented along the same direction as the Tx pathway during operation of the FSO communication terminal. The beam steering unit is configured to adjust the direction of the Rx and Tx pathways. The controller system is configured to apply a point ahead offset to the direction of the Rx and Tx pathways based on both (a) an estimated reception of the Tx optical beam at the remote FSO terminal (given the known relative motion) and (b) an estimated reception of the Rx optical beam at the FSO terminal (given the known relative motion).

The estimated reception of the Tx optical beam at the remote FSO terminal may be based on a Tx pointing loss function and the estimated reception of the Rx optical beam at the FSO terminal may be based on a Rx coupling loss function. In some embodiments, the point ahead offset minimizes a sum of the Tx pointing loss function and the Rx coupling loss function. Additionally or alternatively, the point ahead offset is selected such that Tx pointing loss is below a threshold value and the point ahead offset is selected such that Rx coupling loss is below the same threshold value or a different threshold value.

The point ahead offset may be smaller than the point ahead and it may change over time. The direction of the Rx and Tx pathways may be equal to the point ahead minus the point ahead offset. In some embodiments, the point ahead is less than 20 microradians and the point ahead offset is greater than zero and less than or equal to 9 microradians.

The Rx pathway may include a wavefront sensor that receives a portion of the Rx optical beam. In this case, the control system may modify the point ahead offset based on a location or position of the portion of the Rx optical beam on the wavefront sensor. In some embodiments, the Rx pathway includes a single mode fiber oriented to receive at least a portion of the Rx optical beam. Additionally or alternatively, the Rx pathway may include an optical amplifier configured to amplify at least a portion of the Rx optical beam.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
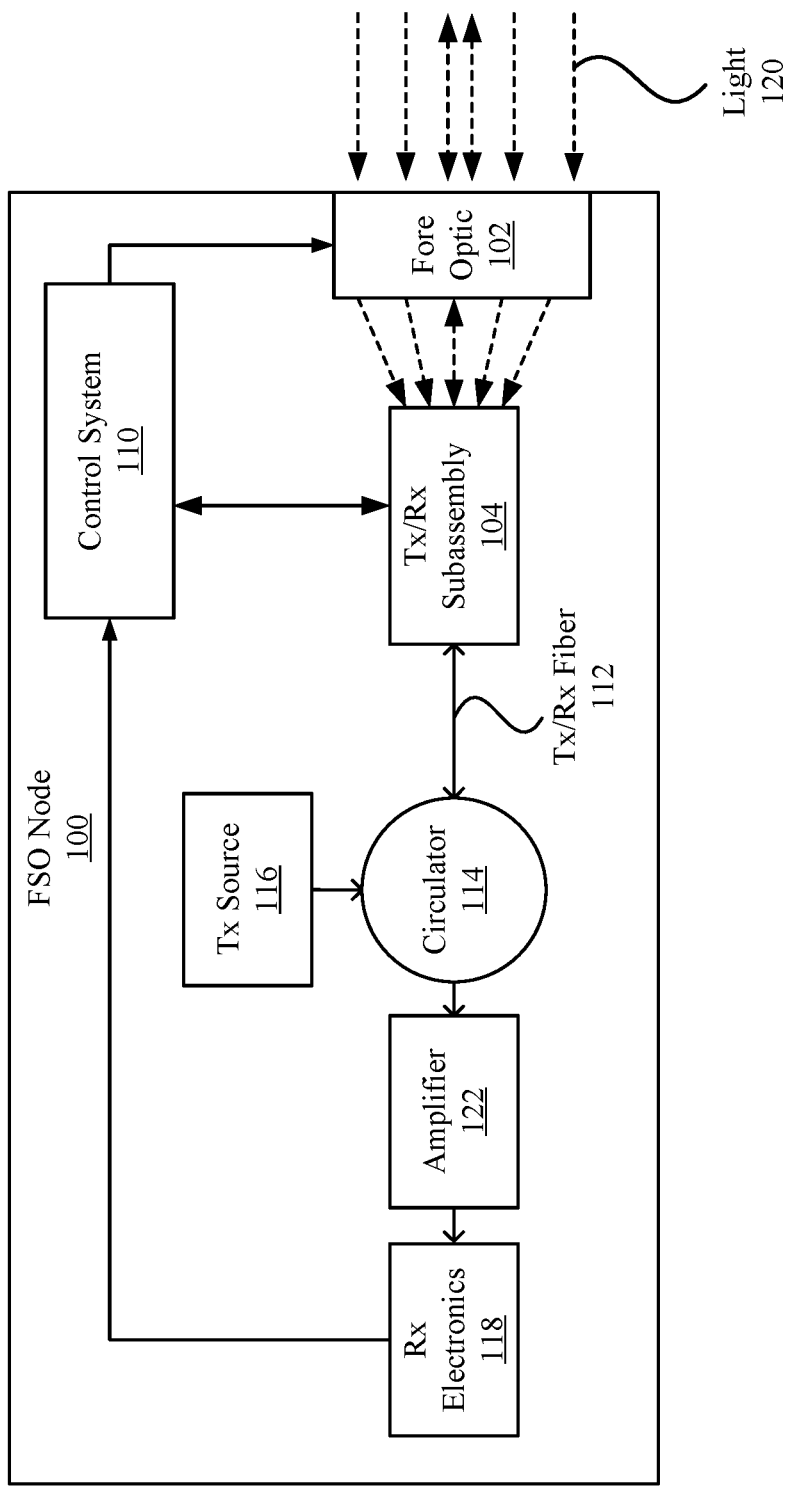
FIG. 1A is a block diagram of a free space optical (FSO) node, according to one embodiment.

FIG. 1A is a block diagram of an FSO node 100, according to one embodiment. The FSO node 100 communicates with a remote FSO node of similar design by transmitting and receiving FSO optical signals 120 (also referred to as beams). The FSO node 100 includes a fore optic 102 (also referred to as a telescope), Tx/Rx subassembly 104, control system 110, optical circulator 114, Tx source 116, amplifier 122, and Rx electronics 118. The fore optic 102 is optically coupled to the Tx/Rx subassembly 104. The Tx/Rx subassembly 104 is optically coupled to the Rx electronics 118 and to the Tx source 116 by the optical circulator 114. The Rx electronics 118, Tx source 116, Tx/Rx subassembly 104, and fore optic 102 are electrically coupled to the control system 110. In other embodiments, the FSO node 100 may contain additional, fewer, or different components.

FIG. 1A illustrates a node design with collinear Tx and Rx optical components. This eliminates the "boresight problem" of having to maintain alignment between Tx and Rx optical systems. For example, the alignment between the Tx and Rx optical systems remains constant during operation of the node (e.g., the collinear system doesn't include a component configured to change the alignment). In the collinear approach, the same primary optical system carries signals both for Tx and Rx paths, reducing weight and complexity of separate optical components for Tx and Rx beams. Collinear optical design also simplifies the system and enhances reliability by eliminating separate pointing and tracking mechanisms for Tx and Rx. Reliance on fiber-based components (as in FIG. 1A) further reduces system weight and simplifies assembly. These properties are especially important for systems to be used aboard spacecraft or other applications that require robustness, light weight, and high reliability.

The light 120 includes received and transmitted optical signals for FSO node 100. The received and transmitted optical signals can include data-encoded communication information. As indicated in FIG. 1A, optical signals 120 travel bi-directionally into (i.e., the receive direction) and out of (i.e., the transmit direction) the FSO node 100 through the fore optic 102.

The fore optic 102 is an optical component that collects and directs received light signals 120 to the Tx/Rx subassembly 104 and directs transmit light signals 120 from the Tx/Rx subassembly 104 to the remote FSO node 100. For instance, the fore optic 102 may include a lens and/or a beam expander. The position of the fore optic 102 may be physically controlled by the control system 110. For example, based on position information from the Tx/Rx subassembly, the control system 110 may adjust the position of the fore optic 102 (or a component of the fore optic) such that the received light 120 is centered upon the Tx/Rx subassembly 104. The fore optic 102 may be configured to spread, focus, redirect, and otherwise modify the light 120 passing through the fore optic 102. The fore optic 102 may also include optical components configured to reduce external effects not relevant to beam alignment of the received light 120. For example, the fore optic 102 may include a component that reduces atmospheric scintillation effects. The fore optic 102 may be as simple as a single lens or it may include additional optical components, such as diffusers, phase screens, beam expanders, and lenses.

Figure 1B:
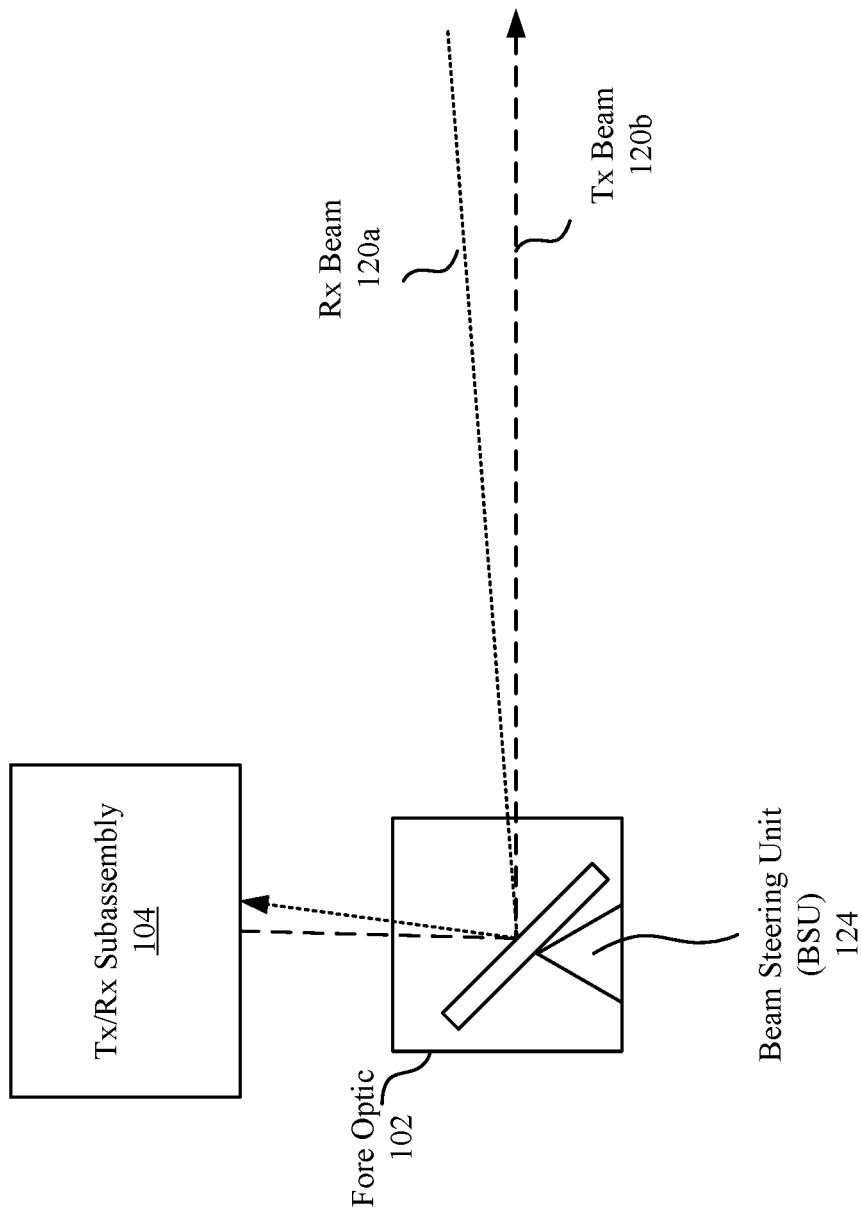
FIG. 1B is a block diagram of a beam steering unit of the FSO node, according to one embodiment.

In some embodiments, the fore optic 102 includes a beam steering unit (BSU). FIG. 1B illustrates an example fore optic 102 with a BSU 124. For simplicity, the BSU 124 is the only illustrated component of the fore optic 102 in FIG. 1B. However, as previously described, the fore optic 102 may include additional or other components.

The BSU 124 is an optical component that receives instructions from the control system 110 to direct Rx beams 120a to the Tx/Rx subassembly 104 and directs Tx beams 120b to a remote FSO node. The BSU 124 may take many different forms. The BSU 124 can be a mechanically driven reflective or refractive device. Examples of such devices include mirrors, Fresnel devices, lenslet arrays and more. A mechanical driver for any one of these examples can include voice-coil actuators, piezoelectric actuators, servo-motor driven positioners, and many other approaches. Microelectronic arrays (MEMS) devices can also be used to steer a beam. Opto-acoustic devices that exploit acoustic waves in reflective or refractive materials can also be used.

The Tx direction may be determined or updated based on feedback signals (e.g., alignment errors) from the control system 110. In some cases, the BSU 124 is oriented to direct the Tx beam 120b along the same direction as the Rx beam 120a is received (e.g., if the FSO nodes are stationary relative to each other). In other cases, the BSU 124 is oriented to direct the Tx beam 120b along a different direction. As illustrated in FIG. 1B, in these cases, the Tx/Rx subassembly 104 may receive the Rx beam at a different angle or location than the Tx beam. In an example case, atmospheric conditions between nodes 100 can affect beams differently depending on their propagation direction. In this case, Tx and Rx beams may travel different optical paths between nodes 100. In another example case, if a remote node is moving, the BSU 124 may direct a Tx beam with an angular bias to account for travel time of the Tx beam.

Referring back to FIG. 1A, the Tx/Rx subassembly 104 receives light signals 120 directed by the fore optic 102 and transmits light signals 120 from the Tx source 116. The Tx/Rx subassembly 104 is used for positioning, acquisition, and tracking (PAT). Specifically, light 120 received by the Tx/Rx subassembly 104 is used to determine alignment information of the Tx/Rx subassembly 104 in relation to the fore optic 102 and the FSO node 100 in relation to a remote FSO node. For example, the Tx/Rx subassembly 104 includes detection sensors that detect the light signals 120 from the fore optic 102 and determine alignment information from the received light 120. The Tx/Rx subassembly 104 can provide alignment information to the control system 110.

The optical circulator 114 allows light signals 120 to pass between the Rx electronics 118, Tx source 116, and Tx/Rx subassembly 104. Through the circulator 114, received light signals 120 from the Tx/Rx subassembly 104 are directed to the Rx electronics 118 and transmit light signals 120 from the Tx source 116 are directed to the Tx/Rx subassembly 104. The circulator 114 can be a single-mode or multi-mode circulator.

The Tx/Rx fiber 112 is an optical fiber, such as a single-mode fiber (SMF) or a multi-mode fiber (MMF), that carries both Rx and Tx beams. The use of a single-mode fiber may allow higher bandwidths compared to a multi-mode fiber. For example, for bandwidths of 10 Gbps (gigabytes per second) and higher, the Rx electronics 118 require a single mode fiber. In another example, long range FSO link systems may also require SMF receivers to get higher receiver sensitivity. In FSO Rx subsystems that use a single-mode fiber to collect the Rx optical beam, the core of the optical fiber is small (e.g., a diameter of 9 mm) and Rx signal that misses it is lost. Therefore, even a small pointing misalignment causes significant coupling loss. This may motivate the use of a multi-mode fiber or a plurality of single-mode fibers in a receiver system. These collect the optical beam over a wider range of incoming angles, and thereby confer additional robustness in pointing and tracking. However, some Rx signal is nevertheless lost whenever pointing ahead is implemented. Furthermore, the use of a multi-mode fiber or multiple single-mode fibers may add undesirable system complexity and cost. While FIG. 1A illustrates a single Tx/Rx fiber 112, the node 100 may include multiple fibers, for example, a Tx fiber and a Rx fiber that are parallel to each other.

The Rx electronics 118 determine data encoded in the received light 120 signals. The Rx electronics 118 can include optical components, such as optical filters, to prepare the received light 120 to be converted to electrical signals. The Rx electronics 118 can include photodetectors, such as avalanche photodiodes (APDs), which convert the received light 120 into an electrical signal. The photodetectors may be capable of detecting light 120 in low light and high light situations (e.g., high saturation). The Rx electronics 118 can also include any further electronics and/or computer instructions that process the electrical signal corresponding to the received light 120, which may be embodied in digital or analog circuits, implemented using any one or more of application specific integrated circuits (ASICs), field-programmable gate arrays (FPGAs), and general purpose computing circuits, along with corresponding memories and computer program instructions for carrying out operations on the data. The specifics of these components are not shown for clarity and compactness of description.

In some embodiments, the FSO node 100 includes an optical amplifier 122. Due to the high data-rates (e.g., 10 Gbps or higher) and distances between FSO nodes, the received Rx signals may be weak. Thus, an optical amplifier may amplify Rx signals in the fiber 112 to levels suitable for electronic detection and data decoding. Some example optical amplifiers require coupling to a single mode fiber and cannot couple to a multi-mode fiber.

The Tx source 116 converts transmit data into transmit light signals 120. The transmitted light 120 is sent to the Tx/Rx subassembly 104 via the circulator 114. The Tx source 116 can include a laser and associated optical components to produce the transmit light 120 signals. For example, the Tx source 116 includes a seed laser and one or more fiber amplifiers, such as an Erbium-doped fiber amplifier (EDFA). The Tx source 116 can also include electronics and/or computer instructions that modulate the transmit light signals 120 and encode the underlying data to be transmitted, including any other physical (PHY) layer or medium access control (MAC) related processes, such as the addition of error correction and so on. Similar to the Rx electronics 118, the Tx source 116 may be embodied in digital or analog circuits, implemented using any one or more of application specific integrated circuits (ASICs), field-programmable gate arrays (FPGAs), and general purpose computing circuits, along with corresponding memories and computer program instructions for carrying out operations on the data. The specifics of these components are not shown for clarity and compactness of description.

The control system 110 includes software or hardware that receives input from the Rx electronics 118 and the Tx/Rx subassembly 104 to control a position of the fore optic 102 (or a component of the fore optic 120) and the Tx/Rx subassembly 104 such that the fore optic 102 directs received light signals 120 to the Tx/Rx subassembly 104. Furthermore, the control system 110 can send instructions to position the fore optic 102 and the Tx/Rx subassembly 104 such that transmit light signals 120 are transmitted to a remote FSO node 100. For example, the control system 110 may position the fore optic 102 so that a transmit light signal 120 propagates along a direction that is approximately parallel (but in an opposition direction) to a received light signal 120. In another example, if the remote FSO node is moving, the control system 110 can direct a transmit light signal 120 with an angular bias to account for the travel time of the transmit light signal 120 and other delays due, for example, to received signal processing.

Figure 2A:
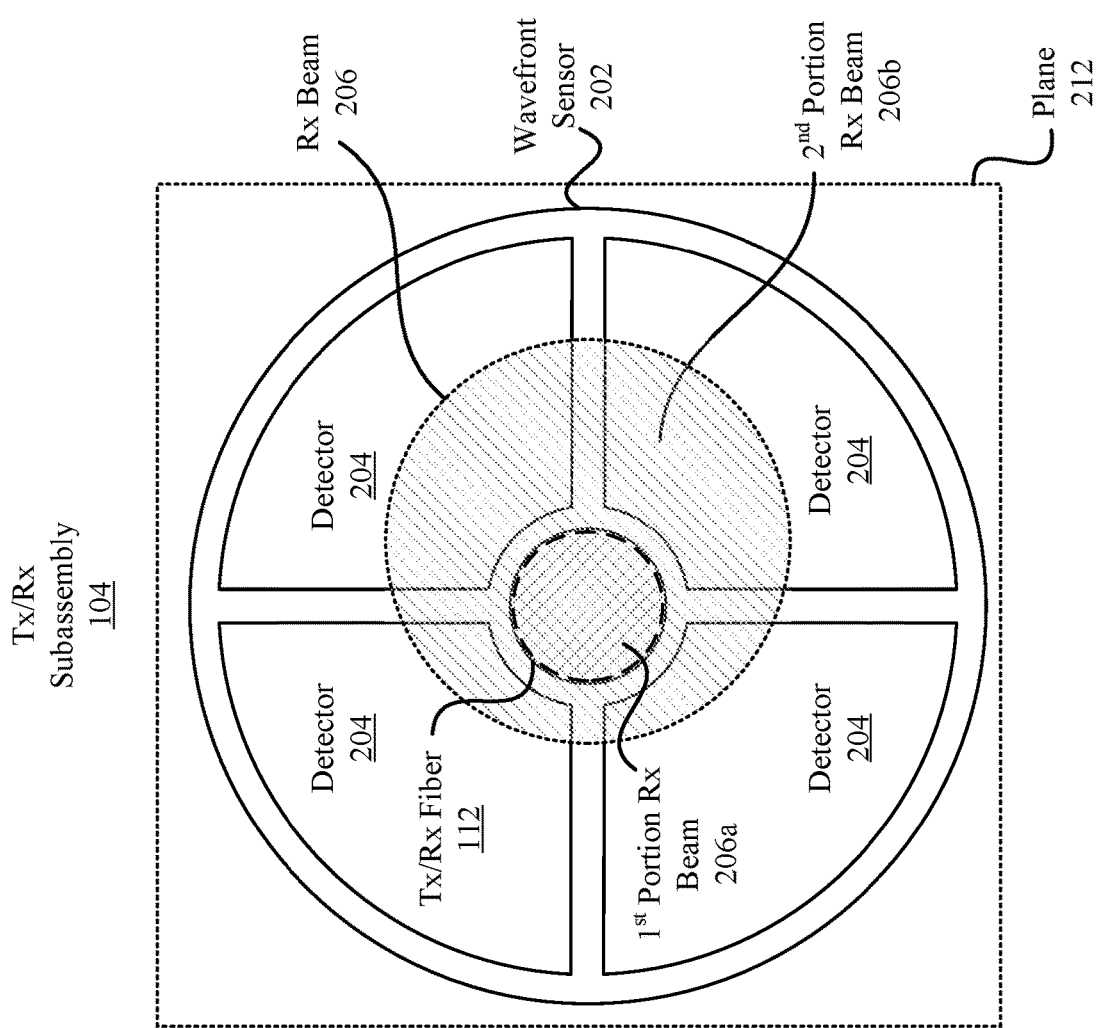
FIGS. 2A and 2B are diagrams of an optical tracking device (the Tx/Rx Subassembly), according to one embodiment.
Figure 2B:
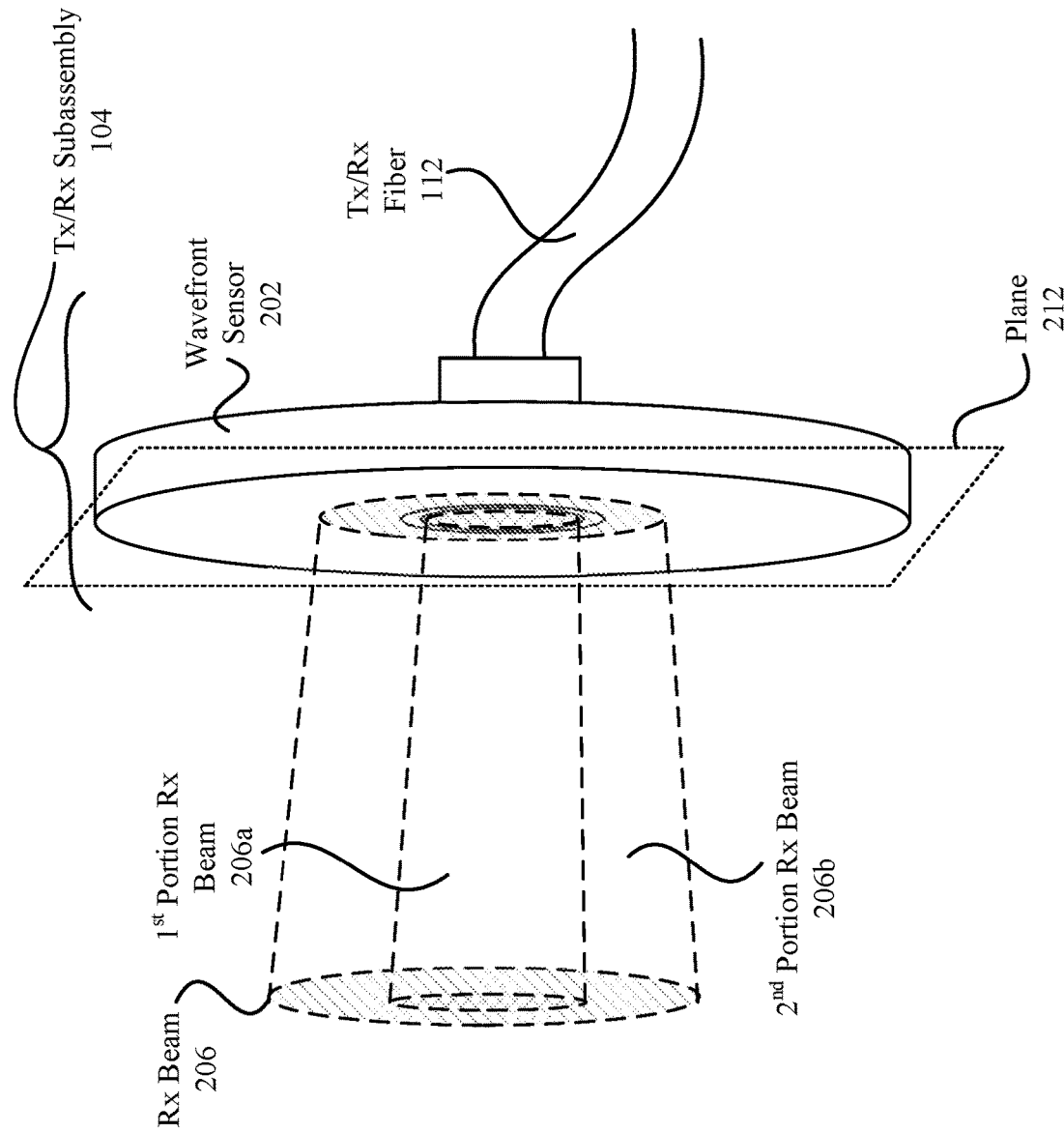

FIGS. 2A and 2B are diagrams of an optical tracking device (the Tx/Rx Subassembly), according to one embodiment. Specifically, FIG. 2A is a front view of the Tx/Rx subassembly 104 and FIG. 2B is a perspective view of the Tx/Rx subassembly 104. These two figures have similar reference numerals and are discussed together. The Tx/Rx subassembly 104 includes an initial end of the Tx/Rx fiber 112 surrounded by a wavefront sensor 202 in plane 212. The Tx/Rx subassembly 104 receives an example Rx beam 206. In other embodiments, FIGS. 2A and 2B may contain additional, fewer, or different components.

The example Rx beam 206 is directed by the fore optic 102, travels to plane 212, and contains encoded communication information from a remote FSO node 100. The Tx/Rx fiber 112 receives a first portion of the Rx beam 206a and the wavefront sensor 202 receives a second portion of the Rx beam 206b. If no portion of the Rx beam 206 is received by the Tx/Rx fiber 112 (e.g., Rx beam 206 isn't incident on the fiber or the angle of incidence is large), then the FSO node 100 is not capturing the data intended for receipt. In this case, the Tx/Rx subassembly 104 or fore optic 102 may be repositioned.

The wavefront sensor 202 lies in plane 212 and is used for signal acquisition and alignment of the FSO node 100 system. To do this, the wavefront sensor 202 uses detectors 204 to detect the position of the received second portion of the Rx Beam 206b on the Tx/Rx subassembly 104. Based on the detected position of the received second portion of the Rx beam 206b, the FSO node 100 can align optical components of the FSO node 100 (e.g., the fore optic 102) so that the Rx beam 206 is centered on the wavefront sensor 202 (or another location of the sensor 202). In other embodiments, components other than a wavefront sensor may perform position detection, acquisition, and tracking. By way of example, a sensor can be an overmoded guided-wave structure with a means to measure the power in the structure's propagating modes.

The example wavefront sensor 202 is a quad cell detector. Together, the four detectors 204 determine the horizontal and vertical position of the Rx beam 206 on the wavefront sensor 202. If the displacement of the Rx beam 206 on the wavefront sensor 202 is not zero, the FSO node 100 may position the Tx/Rx subassembly 104, the fore optic 102, or the FSO node 100 to reduce or eliminate the displacement. The displacement may be determined or calculated based on a comparison of the detected signals from each detector 204. For example, the ratio of the difference of the Rx beam 206 on each half of the wavefront sensor 202 divided by the whole is used to determine a percentage offset from the center of the wavefront sensor 202. The wavefront sensor 202 may include more, fewer, or different detectors 204.

Referring now to FIGS. 3A-3E, two satellites 301, 302 are in orbit (e.g., in low-Earth orbit (LEO)). Each satellite includes an FSO node and communicate with each other over an FSO link (e.g., an optical intersatellite link (OISL)). FIGS. 3A-3E illustrate the FSO link from the point of view of the FSO node in satellite 301. A similar situation exists for satellite 302. The first satellite 301 communicates with the second satellite 302, and the second satellite 302 moves on a projected path 307 (also referred to as known travel path) from location 308R to location 308T. FIGS. 3A-3E illustrate the position of satellite 301 at time t1 and the positions of satellite 302 at times t1-Δ, t1, and t1+Δ, where Δ is the travel time for an FSO beam to travel from one satellite to the other. Since the projected path 307 may be known, satellite 301 knows that satellite 302 will be at location 308T when it receives a new beam transmitted from satellite 301 at time t1. Note that the FSO beams are illustrated in FIGS. 3A-3E as lines for convenience. Practically, the beams have widths and spread out over time. For example, the beams have gaussian profiles.

Both satellites being in motion, the Rx beam 303 received by satellite 301 at time t1 appears to come from location 308R from second satellite 302. Location 308R may be satellite 302's actual location at the time of transmitting Rx beam 303. However, location 308R may not be satellite 302's actual location at time of transmitting Rx beam 303 (discussed further with respect to FIG. 3E).

Figure 3A:
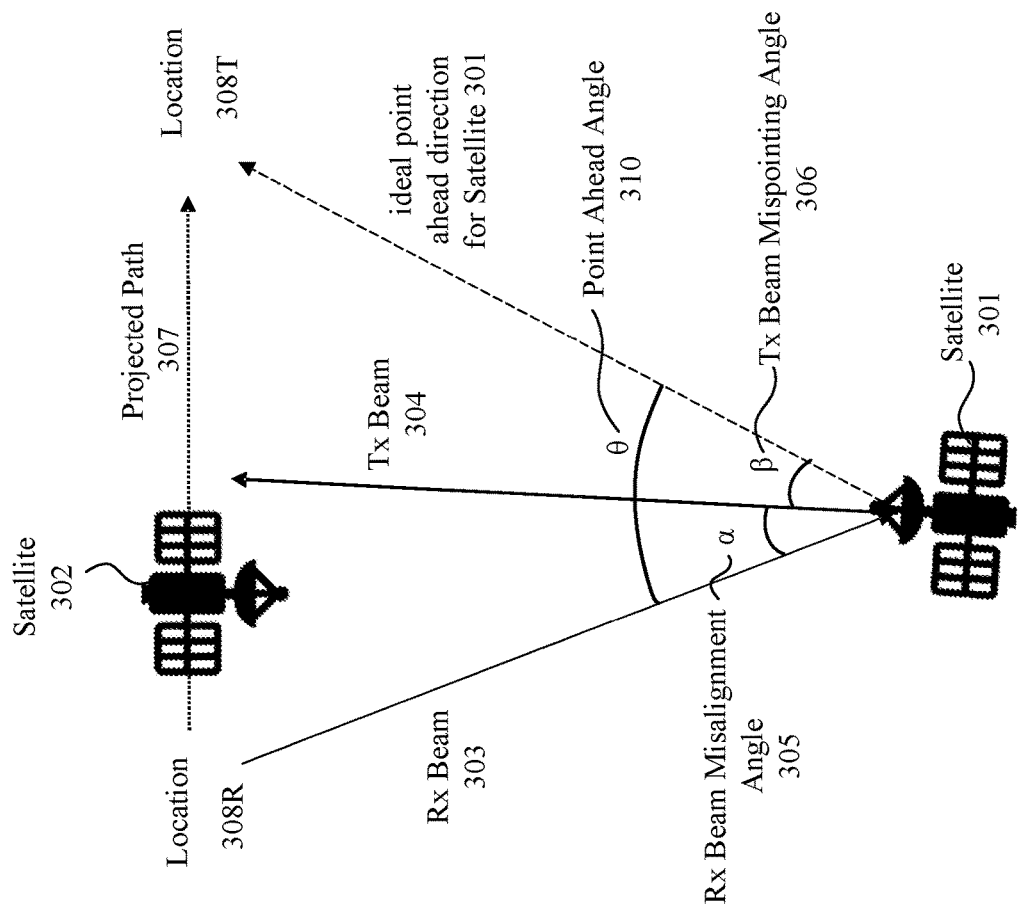
FIGS. 3A-3E are diagrams of an FSO link between two satellites, according to some embodiments.
Figure 3B:
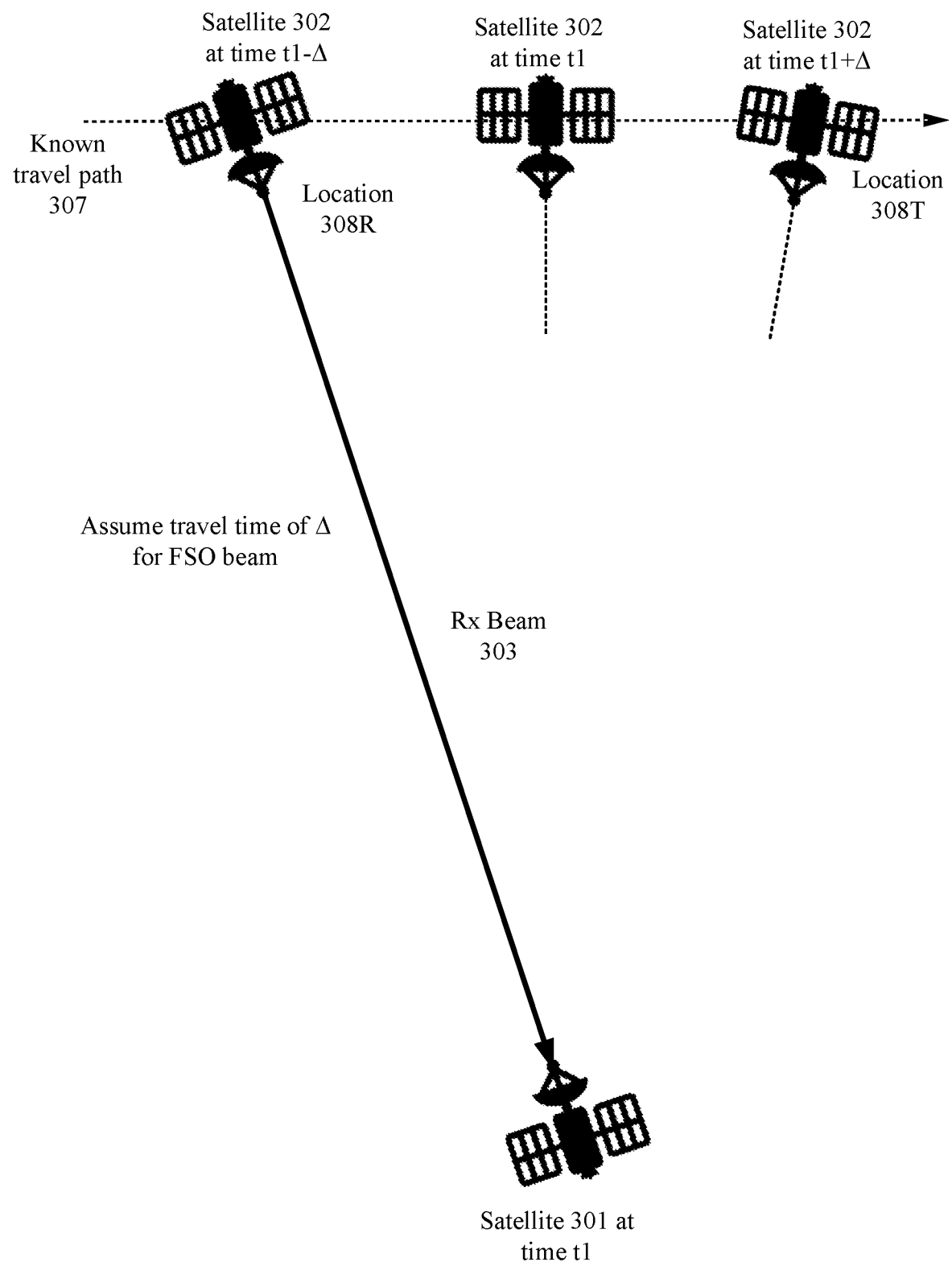
Figure 3C:
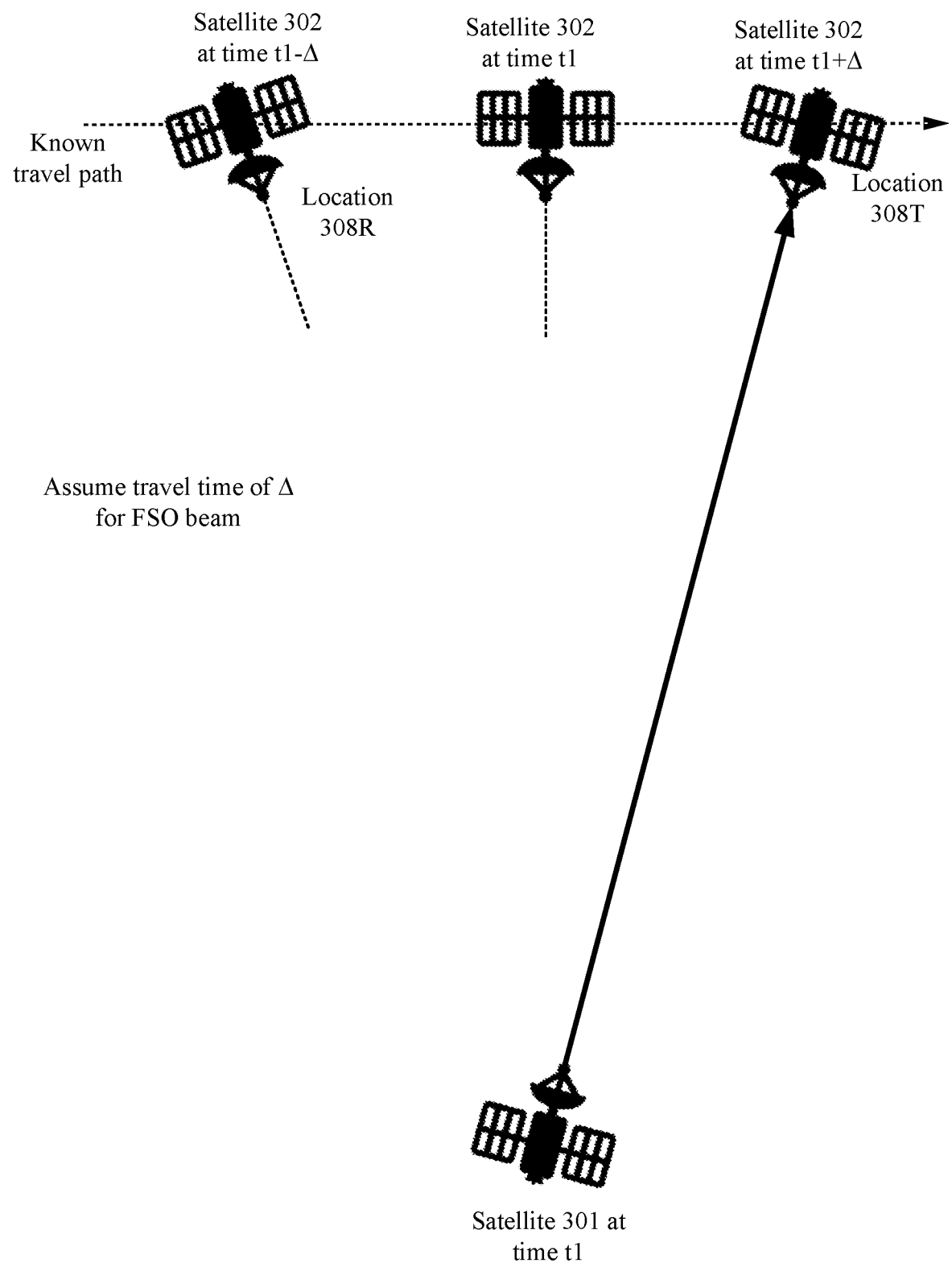
Figure 3D:
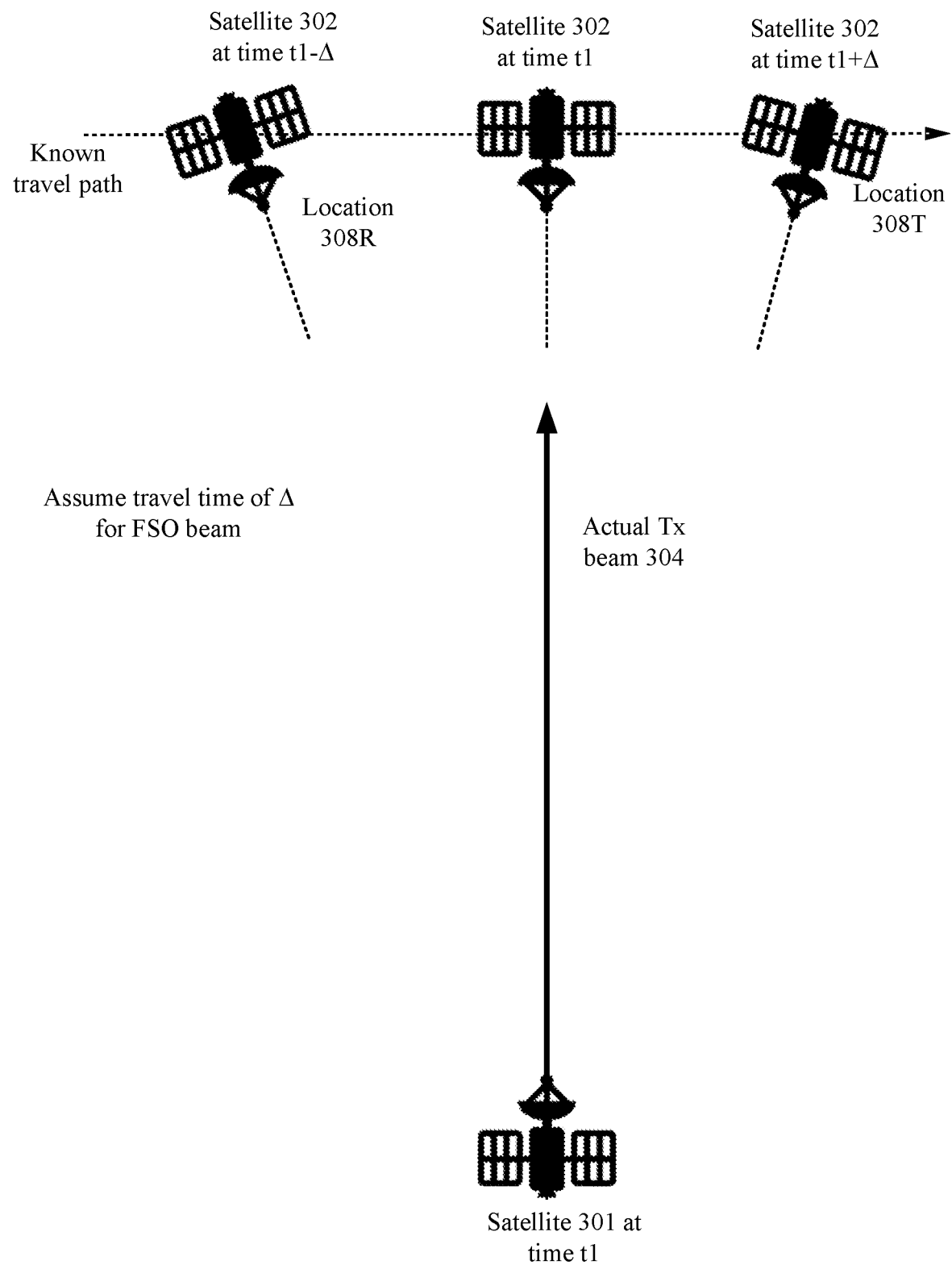

The point ahead angle in this system is angle 310. As previously described, a point ahead angle is an angular bias relative to a Rx direction that accounts for travel time of a Tx beam (for situations where the relative velocity and distance between a local and a remote FSO node is large). In FIG. 3A, the point ahead angle 310 is equal to the sum of Rx beam misalignment angle 305 and the Tx beam mispointing angle 306. The Rx misalignment angle 305 is the angular deviation of the Tx beam 304 away from the Rx direction, and the Tx beam mispointing angle 306 is the angular deviation of the Tx beam 304 away from the point ahead angle 306.

To maintain the FSO link, satellite 301 aims to transmit Tx beam 304 so that it is received by satellite 302 and also aims to receive Rx beam 303 from satellite 302. However, satellite 301 may include collinear Tx and Rx optical components (e.g., as described with reference to FIG. 1A). In this case, if satellite 301 points towards location 308T (e.g., see FIG. 3C), Tx beam 302 will be received by satellite 302 with little or no coupling losses ("Tx pointing losses") (this assumes that satellite 302 will point at satellite 302 to receive Tx beam 302). However, the Rx optical path of satellite 301 will be misaligned with the propagation direction of Rx beam 303 because satellite 301 is not pointing at location 308R, resulting in increased Rx coupling losses. In some cases, this situation results in satellite 301 receiving none of the Rx beam 303 or receiving an amount of Rx beam 303 that is insufficient to maintain the FSO link.

Alternatively, if satellite 301 points towards location 308R (e.g., see FIG. 3B), Rx beam 303 will be received by satellite 301 with little or no Rx coupling losses (this assumes that satellite 302 pointed at satellite 301 to transmit Rx beam 303). However, the Tx optical path of satellite 301 will not be aligned with location 308T, resulting in increased Tx pointing losses. In some cases, this situation results in satellite 302 receiving none of the Tx beam 304 or receiving an amount of Tx beam 304 that is insufficient to maintain the FSO link.

Since satellite 301 cannot point in two directions at once, the actual Tx beam 304 direction is determined by balancing the tradeoff between these two situations. By pointing satellite 301 somewhere between locations 308R and 308T, satellite 301 may receive enough of Rx beam 303 and satellite 302 may receive enough of Tx beam 304 to maintain the FSO link. The specific Tx direction is determined by modifying the point ahead angle by a point ahead offset angle. This modified point ahead angle reduces Rx coupling losses (compared to the point ahead angle) while keeping Tx pointing losses low enough to maintain the optical link. For example, the modified point ahead angle (e.g., angle 305) of Tx beam 304 is the point ahead angle 310 minus the point ahead offset angle (e.g., angle 306). In this case, as the point ahead offset angle is increased, the Rx coupling losses decrease and the Tx pointing losses increase.

Figure 3E:
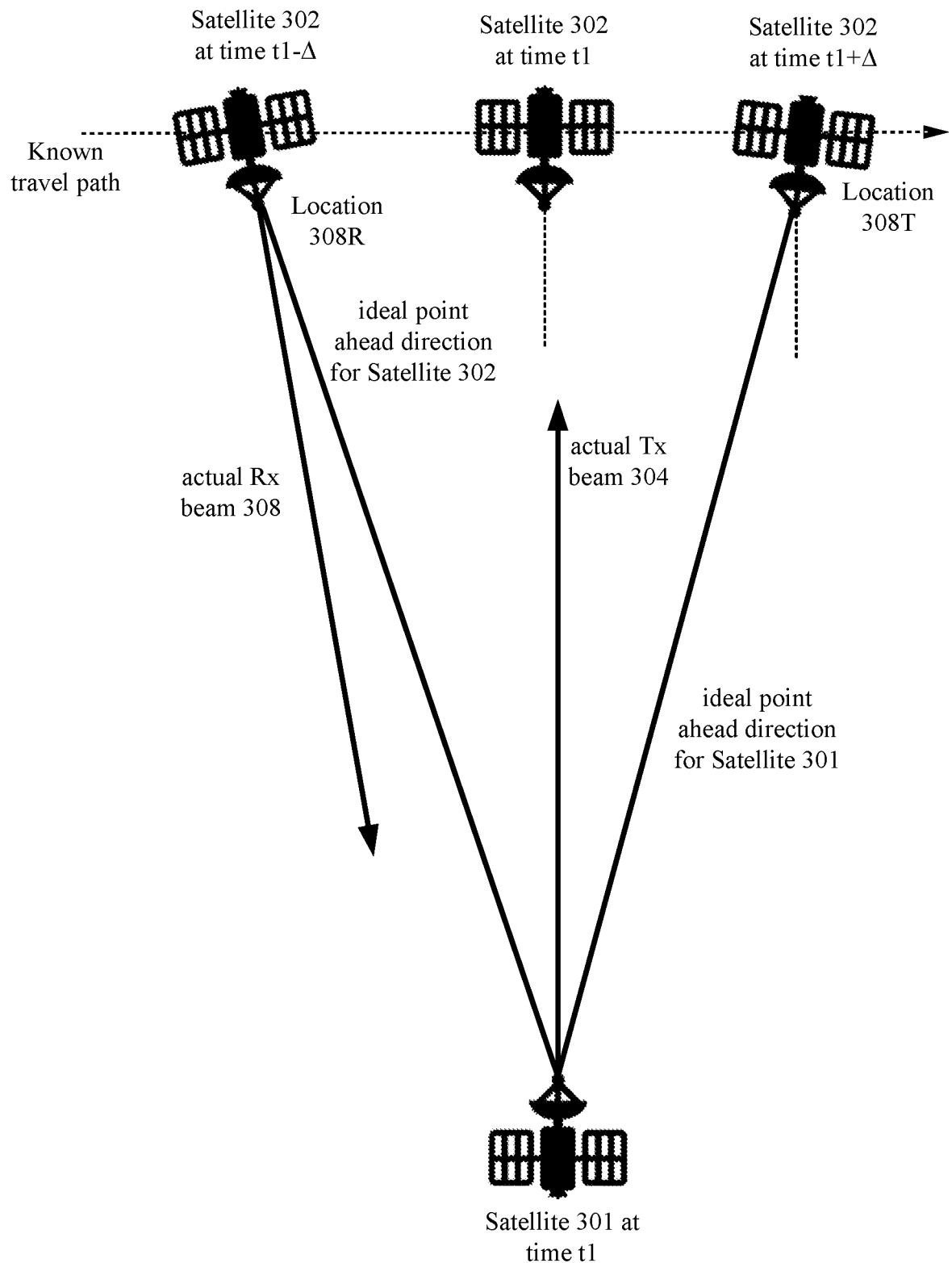

Referring to FIG. 3E, satellite 302 may also be pointing at modified point ahead angles. In this case, the actual Rx beam 308 may not propagate directly toward satellite 301 (which was the ideal point ahead direction for satellite 302 at time t1-Δ), but instead may propagate at a modified angle (indicated by the direction of beam 308). Furthermore, instead of satellite 302 pointing along the ideal point ahead direction for satellite 301, satellite 302 may point at another modified angle (indicated by the dotted line at location 308T). These modified angles by satellite 302 may cause additional Rx coupling losses and Tx pointing losses for satellite 301. In some embodiments, satellite 301 accounts for the modified angles of satellite 302 when determining the modified point ahead angle. In other embodiments, satellite 301 may only consider the ideal point ahead directions.

Referring back to the point ahead offset, the point ahead offset angle may be chosen so that a sum of the Rx coupling losses and the Tx pointing losses is reduced (e.g., minimized). In another example, the point ahead offset angle is chosen so that the Rx coupling losses and the Tx pointing losses are below a threshold, where the threshold ensures that enough of each beam is received to maintain the FSO link. Additionally or alternatively, the point ahead offset angle may depend on the FSO link distance (e.g., derived through timing data exchange), the point ahead angle, the Tx and Rx beam divergences, the configuration of the Tx/Rx subassembly 104, the fiber type of the Tx/Rx fiber 112, aperture size of the telescope 102, or the jitter magnitude.

In some embodiments, the point ahead offset angle ranges from 1-9 microradians (urad). The modified point ahead angle may be implemented when the point ahead angle is 20 urad or less. If the point ahead angle is larger than 20 urad, there may not be a point ahead offset angle that results in sufficient Rx coupling and Tx pointing.

The point ahead offset may be a function of the point ahead angle. Thus, the point ahead offset angle may change over time as the point ahead angle changes (e.g., due to changes in relative speed or distance between satellites 301 and 302). For example, if satellites 301 and 302 are in different orbits or in orbits with significant ellipticity, they may have point ahead angles that change over time due their changing relative heading, speed, and distance. In another example, two satellites in the same elliptical orbit may experience different accelerations in different parts of the orbit and therefore may have variable point-ahead, even though they nominally follow identical paths around the Earth. For example, satellites in identical orbits with eccentricity 0.7 but separated by ¼ period sometimes see each other approaching or receding to either side of orbital perigee. However, in some situations, the point ahead angle may be constant. For example, if satellites 301 and 302 are in orbits with fixed relative speed and position (e.g., identical but phase-offset circular orbits around the Earth), such orbits may result in a constant point ahead angle.

The modified point ahead, point ahead, or point ahead offset may be pre-calculated and stored in a lookup table that is accessed during operation of the FSO node. For example, modified point ahead angles may be predetermined for FSO nodes in orbit since their absolute and relative motions may follow well-defined orbital trajectories. For example, if satellites 301 and 302 are in identical orbits with eccentricity 0.7 but separated by ¼ period, the two satellites may have point-ahead angles that switch positive and negative but predictably repeat with each orbit. In another example, satellites 301 and 302 have two circular orbits that are inclined relative to each other. Such orbits cross each other and thus may predictably switch pointing angle and point-ahead polarity at the crossings. Other embodiments may compute the modified point ahead angles dynamically during operation (e.g., at the time it is required to orient the Tx beam 304). For example, a point-ahead processor (e.g., implemented as part of control system 110) may use a priori knowledge of orbital parameters to determine instantaneous velocities and directions between the nodes and thereby derive a modified point ahead angle. Time and frequency synchronization between FSO nodes may also be available to provide an additional estimate of relative range. This can be used to verify or refine the orbital parameters and the modified point ahead direction.

In some embodiments, the modified point ahead is based on real time values, such as the received power, signal-to-noise ratio, or bit error rates at one or both FSO nodes. In some embodiments, a modified point ahead is determined based on signal amplitude or signal quality metrics as they are received or derived at an FSO node. Other example real time values include beam amplitude, signal-to-noise ratio, and polarization balance. After communication is established between a remote and local node, an embodiment may transfer this information over the optical link so that both node controllers maintain history of signal strength at both nodes. This enables the processors at either or both nodes to jointly and cooperatively optimize the modified point ahead offset angles in either or both directions.

In one approach, a modified point ahead angle is implemented by adding a wavefront offset to the feedback loop from a wavefront sensor (e.g., sensor 202). For example, to maintain the modified point ahead angle, the control system 110 instructs the beam steering unit 124 to steer an Rx beam at a location on the wavefront sensor that is offset from the center.

The modified point ahead angle may be implemented even when the optical beams between enter and leaves Earth's atmosphere (e.g., if one node is in low-Earth orbit (LEO) and the other node is on earth's surface). In these situations, point ahead functionality can be extended by incorporating a refraction computation, based on orbital mechanics or on pointing aberrations that can be attributed to the atmosphere.

Figure 4A:
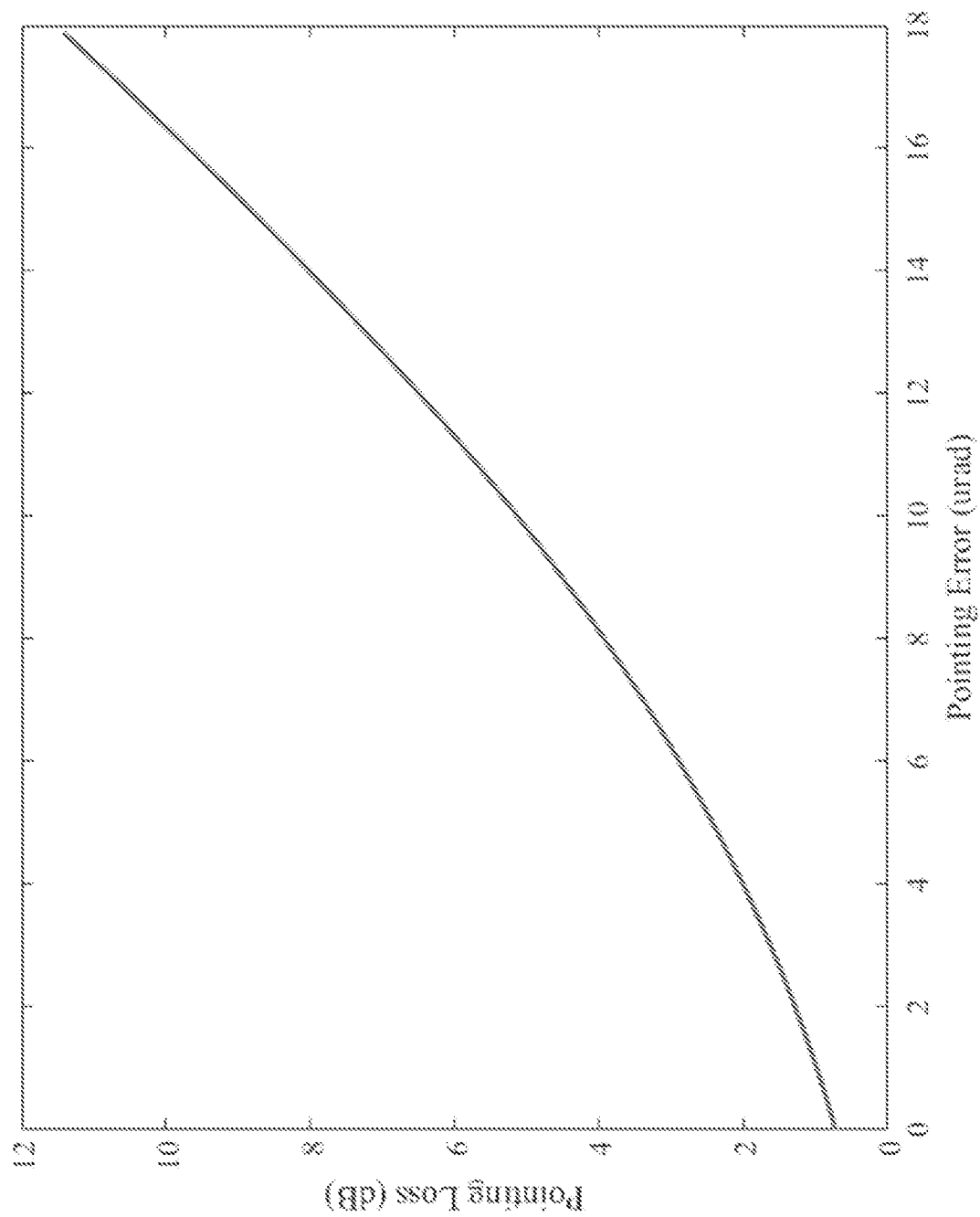
FIGS. 4A-4D are graphs of loss functions, according to some embodiments.

FIG. 4A is a graph of an example Tx pointing loss function that describes Tx pointing losses. Specifically, FIG. 4A illustrates Tx pointing loss vs. pointing error for an FSO node with a 90-millimeter aperture, a beam divergence of 37.64 urad, and it assumes 6 urad of jitter, according to an embodiment. Pointing error is the deviation away from the point ahead angle (with respect to FIG. 3A, the pointing error is the Tx mispointing angle 306). Notice that as pointing error increases, the pointing loss exponentially increases. In other words, the larger the point ahead offset angle, the less a remote FSO node will receive of a Tx beam. Practically, beam divergence reduces the fraction of power transmitted from one node that is received by the other, and this pointing loss increases with range. Thus, for communication between nodes at short range, the tolerable pointing loss may be greater than at longer ranges. In some embodiments, a maximum tolerable pointing loss may depend on the FSO link error margin which may be a function of many parameters e.g., including link distance.

Figure 4B:
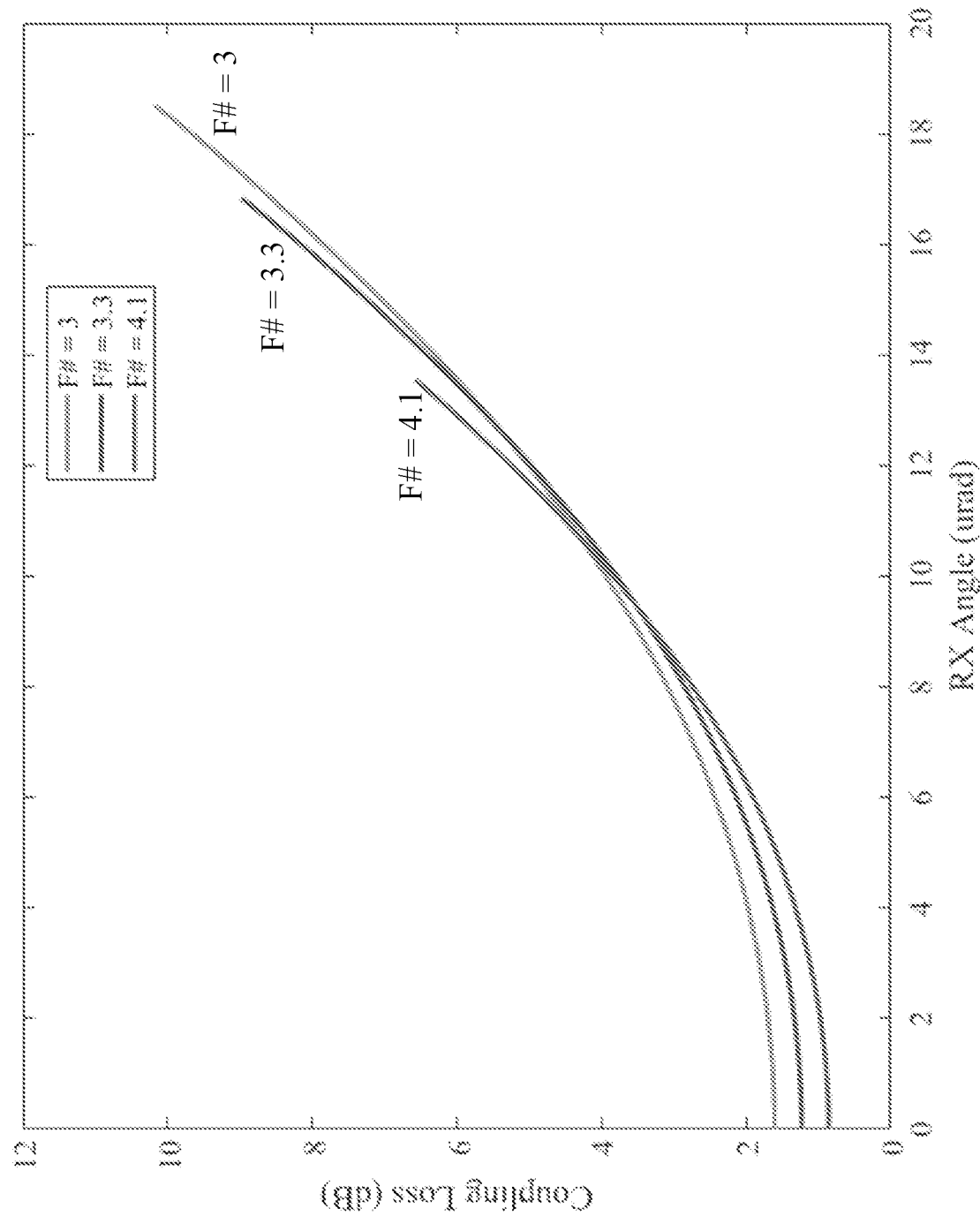

FIG. 4B is a graph of example Rx coupling loss functions that describe Rx coupling losses. Specifically, FIG. 4B describes Rx coupling loss vs. Rx angle for example lenses (in the fore optic) with various f-numbers (F #), according to an embodiment. The graph describes an FSO system with a 90 mm aperture. Rx angle is the deviation away from the Rx direction of a Rx beam (with respect to FIG. 3A, the Rx angle deviation is the Rx beam misalignment angle 305), and f-number refers to the ratio of focal length to the diameter of the entrance pupil of the lens.

Similar to the previous figure, the plots in FIG. 4B are exponential. Thus, as Rx angle increases, the coupling losses increase at a faster rate. Additionally, for small Rx angles (e.g., less than 10 urad), lenses with smaller f-numbers have larger coupling losses, while for larger Rx angles (e.g., larger than 10 urad), lenses with smaller f-numbers have smaller coupling losses. As described above with respect to tolerable pointing losses, tolerable coupling losses may also depend on the FSO link configuration. For example, for communication between nodes at short range, the tolerable coupling loss may be greater than at longer ranges.

Figure 4C:
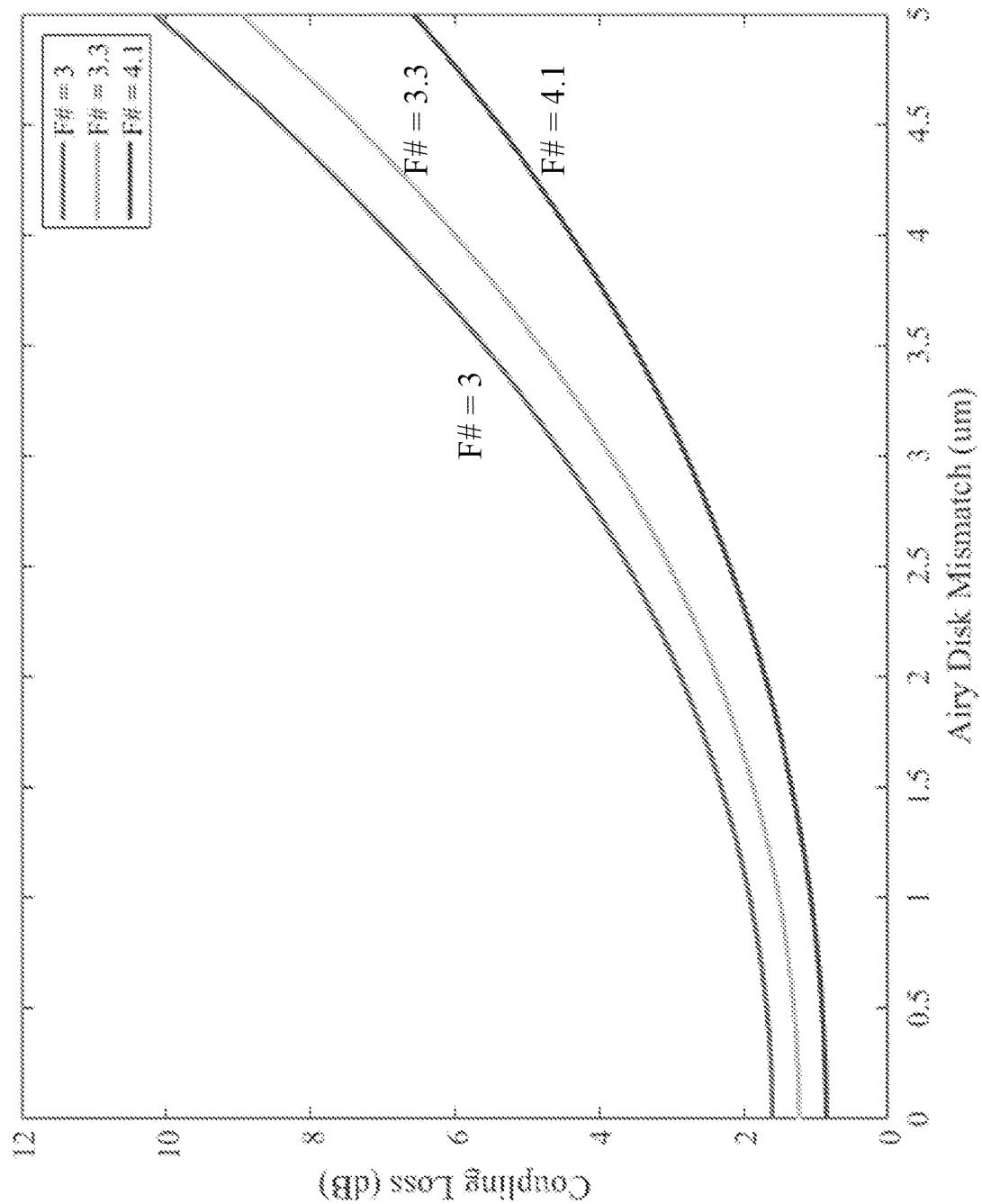

FIG. 4C is another graph of example Rx coupling loss functions that describe Rx coupling losses. Specifically, FIG. 4C is a graph of coupling loss vs. airy disk mismatch for lenses (in the fore optic) with various f-numbers, according to an embodiment. The airy mismatch describes the difference between the location of the focus of an Rx beam and a center point of the Rx fiber. In the example of FIG. 2A, the airy mismatch is the distance between a center point of the fiber 112 and a center point of Rx beam 206. Similar to the previous figures, the plots in FIG. 4C are exponential. Thus, as airy disk mismatch increases, the coupling losses increase at a faster rate. Additionally, lenses with smaller f-numbers have larger coupling losses.

Figure 4D:
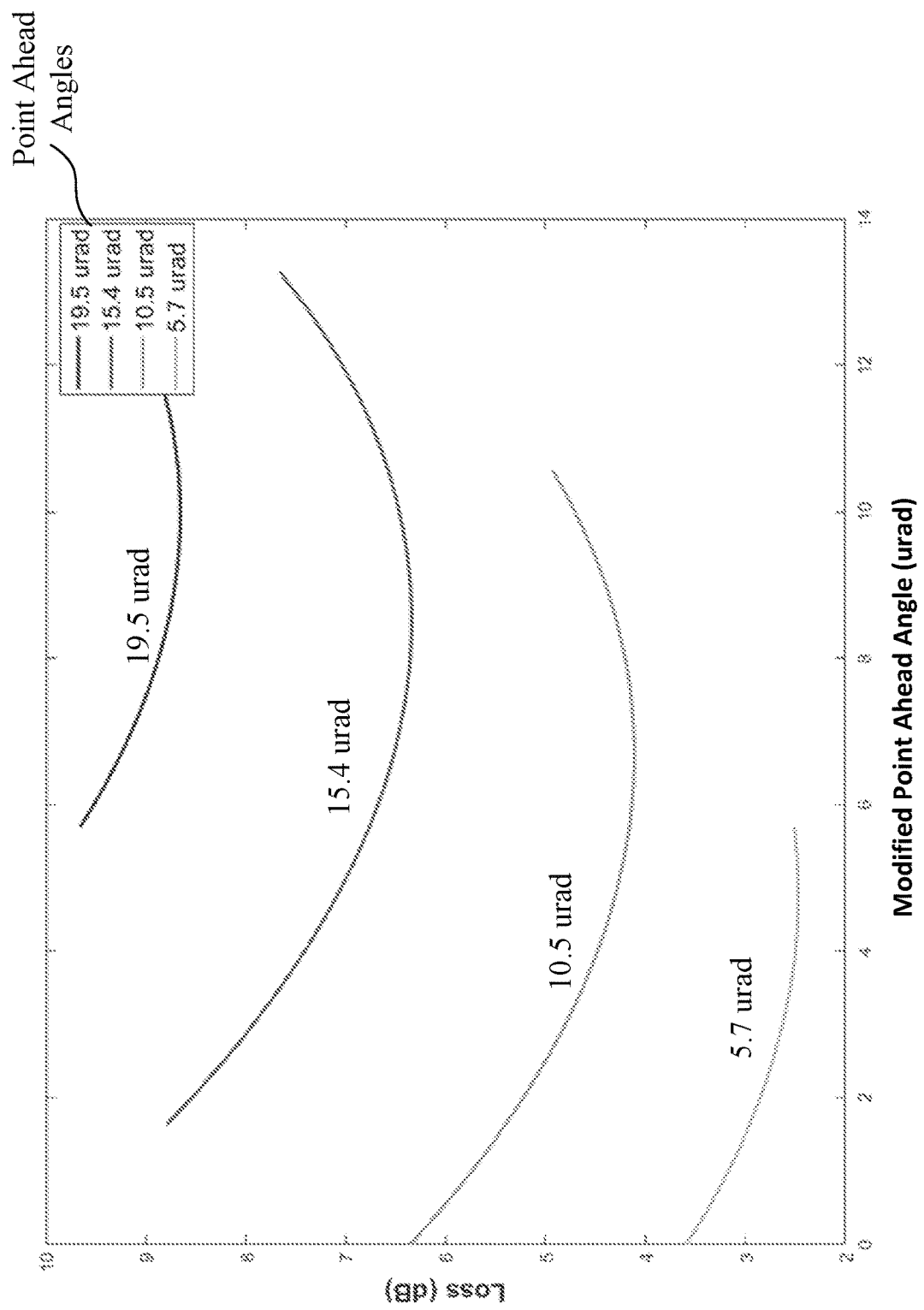

FIG. 4D is a graph of loss vs. modified point ahead angle for various point ahead angles for a fore optic lens with an f-number of 4.1. Loss describes the combined Rx coupling losses and the Tx pointing losses for a given modified point ahead angle. Thus, the point ahead offset angle may be determined by subtracting the modified point ahead angle from the point ahead angle. Since Rx coupling losses and Tx pointing losses are each exponential, the resulting combined loss plots have u-shapes. Thus, for a given plot, the optimal modified point ahead angle is an angle at the bottom of the u-shape that minimizes the losses. In the example of FIG. 4D, modified point ahead angles of 5, 6.5, 8.8, and 10.2 urad respectively minimize the loss for point ahead angles of 5.7, 10.5, 15.4, and 19.5 urad. Note that as point ahead angle increases the plots have higher losses and the optimal modified point ahead angle increases.

Although the detailed description contains many specifics, these should not be construed as limiting the scope of the invention but merely as illustrating different examples. It should be appreciated that the scope of the disclosure includes other embodiments not discussed in detail above.

For example, similar conditions and considerations of point-ahead offsets pertain for communication between ground-based stations and stations on aircraft or in low orbit. Similar considerations may also pertain for adversarial uses, as for laser weapons and for communication jamming devices. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Alternate embodiments may be implemented using computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

Depending on the form of the components, the "coupling" between components also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A free space optical (FSO) communication terminal comprising:
   a transmit (Tx) pathway configured to transmit a data-encoded Tx optical beam through free space to a remote FSO communication terminal, wherein the Tx pathway is oriented along a direction in free space, and wherein a relative motion between the two FSO communication terminals is known;
   a receive (Rx) pathway configured to receive a data-encoded Rx optical beam transmitted through free space from the remote FSO communication terminal, wherein the Rx pathway is oriented along the same direction in free space as the Tx pathway; and
   a control system configured to:
      determine a pointing direction for the Rx and Tx pathways, wherein the pointing direction is offset relative to a point ahead and is based on both (a) estimated reception of the Tx optical beam at the remote FSO communication terminal, given the known relative motion, and (b) estimated reception of the Rx optical beam at the FSO communication terminal, given the known relative motion; and
      control a beam steering unit to adjust the orientation of the Rx and Tx pathways in free space based on the determined pointing direction.

2. The FSO communication terminal of claim 1, wherein the estimated reception of the Tx optical beam at the remote FSO communication terminal is based on a Tx pointing loss function.

3. The FSO communication terminal of claim 2, wherein the estimated reception of the Rx optical beam at the FSO communication terminal is based on a Rx coupling loss function.

4. The FSO communication terminal of claim 3, wherein the determined pointing direction for the Rx and Tx pathways minimizes a sum of the Tx pointing loss function and the Rx coupling loss function.

5. The FSO communication terminal of claim 3, wherein the determined pointing direction for the Rx and Tx pathways reduces a Tx pointing loss below a threshold value.

6. The FSO communication terminal of claim 3, wherein the determined pointing direction for the Rx and Tx pathways reduces a Rx coupling loss below a threshold value.

7. The FSO communication terminal of claim 1, wherein the offset is smaller than the point ahead.

8. The FSO communication terminal of claim 7, wherein the adjusted orientation of the Rx and Tx pathways is equal to the point ahead minus the offset.

9. The FSO communication terminal of claim 7, wherein the point ahead is less than 20 microradians.

10. The FSO communication terminal of claim 1, wherein the Rx pathway remains oriented along the same direction as the Tx pathway during operation of the FSO communication terminal.

11. The FSO communication terminal of claim 1, wherein the FSO communication terminal is co-borsighted.

12. The FSO communication terminal of claim 1, wherein the Rx pathway includes a wavefront sensor that receives a portion of the Rx optical beam.

13. The FSO communication terminal of claim 12, wherein the control system is configured to modify the offset based on a location of the portion of the Rx optical beam on the wavefront sensor.

14. The FSO communication terminal of claim 1, wherein the Rx pathway includes a single mode fiber oriented to receive at least a portion of the Rx optical beam.

15. The FSO communication terminal of claim 1, wherein the Rx pathway includes an optical amplifier configured to amplify at least a portion of the Rx optical beam.

16. The FSO communication terminal of claim 1, wherein the offset is greater than zero and less than or equal to 9 microradians.

17. The FSO communication terminal of claim 1, wherein the control system is configured to change the offset over time.

18. The FSO communication terminal of claim 1, wherein the remote FSO communication terminal is mounted to a satellite in orbit.

19. The FSO communication terminal of claim 1, wherein:
   the poitning direction for the Rx and Tx pathway is stored in a lookup table; and
   to determine the pointing direction for the Rx and Tx pathways, the control system is configured to access the pointing direction in the lookup table.

20. The FSO communication terminal of claim 1, wherein to determine the pointing direction for the Rx and Tx pathways, the control system is configured to dynamically compute the pointing direction during operation of the FSO communication terminal.

21. A free space optical (FSO) communication terminal comprising:
   a transmit (Tx) pathway means configured to transmit a data-encoded Tx optical beam through free space to a remote FSO communication terminal, wherein the Tx pathway means is oriented along a direction in free space, and wherein a relative motion between the two FSO communication terminals is known;
   a receive (Rx) pathway means configured to receive a data-encoded Rx optical beam transmitted through free space from the remote FSO communication terminal, wherein the Rx pathway means is oriented along the same direction in free space as the Tx pathway means; and
   a control system means configured to:
      determine a pointing direction for the Rx and Tx pathway means, wherein the pointing direction is offset relative to a point ahead and is based on both (a) estimated reception of the Tx optical beam at the remote FSO communication terminal, given the known relative motion, and (b) estimated reception of the Rx optical beam at the FSO communication terminal, given the known relative motion; and
      control a beam steering means to adjust the orientation of the Rx and Tx pathway means in free space based on the determined pointing direction.

22. The FSO communication terminal of claim 21, wherein the offset is smaller than the point ahead.

* * * * *